June 16, 1964 F. FRAAS 3,137,648
PRETREATMENT OF MINERALS FOR ELECTROSTATIC SEPARATION
Filed Jan. 24, 1962 2 Sheets-Sheet 1

INVENTOR
FOSTER FRAAS

BY
*Ernest S. Cohen*
*Gersten Sadowsky*
ATTORNEYS

June 16, 1964 F. FRAAS 3,137,648
PRETREATMENT OF MINERALS FOR ELECTROSTATIC SEPARATION
Filed Jan. 24, 1962 2 Sheets-Sheet 2

INVENTOR
FOSTER FRAAS
BY
ATTORNEYS

United States Patent Office 3,137,648
Patented June 16, 1964

3,137,648
PRETREATMENT OF MINERALS FOR ELECTROSTATIC SEPARATION
Foster Fraas, Hyattsville, Md., assignor to the United States of America as represented by the Secretary of the Interior
Filed Jan. 24, 1962, Ser. No. 168,559
23 Claims. (Cl. 209—9)
(Granted under Title 35, U.S. Code (1952), sec. 266)

The invention herein described and claimed may be manufactured and used by or for the Government of the United States of America for governmental purposes without the payment of royalties thereon or therefor.

The invention relates to a method for improving the effectiveness of mineral beneficiation processes employing electrostatic separators. More particularly, the minerals to be processed in this way, are first pretreated in accordance with the invention whereby their electrical characteristics are selectively modified or changed. Since electrostatic separation is based on differences in one or more of the characteristic electrical properties of the minerals undergoing separation, the capacity to predetermine such properties by means of the present invention, allows for a more efficient procedure, and a wider range of minerals to be made susceptible for processing in electrostatic separators. Other possible uses of the invention are in those applications which involve surface properties. An example is froth flotation where the adsorptive properties of the feed is changed by discharge treatment.

Basic to the pretreatment of minerals according to the invention is the exposure for a period of time, of a mixture of granular particles containing the mineral, to an environment filled by a particularly selected fluid, at atmospheric or lower pressures, the energy level of which is raised such as by heating or passing an ionized discharge therethrough. An explanation for the difference in the effect of the unactivated gas and the gas subjected to heating or an electrical discharge, may be found in the fact that the electrical discharge places the gas atoms or molecules in a higher energy state, either monatomic, polyatomic or as ions. Thus the oxygen molecule may change to ions, either negative or positive, or to the triatomic form known as ozone. All these reactions occur over a wide range of pressure from several atmospheres down to one-tenth atmosphere or less. It is thought that the pretreatment of the granular particles results in heavier adsorption layers of gases, or provides adsorbed layers of ions which facilitate charge transfer on the particles. The electrical discharge in air probably results in the formation of nitrogen oxide adsorption layers. Among the gases having utility for this purpose are oxygen, hydrogen, carbon dioxide, nitrogen, ammonia, and water vapor. Merely exposing the mineral particles to water vapor was also found satisfactory. High voltage direct current of 10 to 30 kv., or 60 cycle alternating current may be used to produce the electrical discharge. Subjecting minerals enveloped by an appropriate gas to fields produced by high frequency currents at around 100 megacycles, will also accomplish their pretreatment. Although some frequencies for certain gases may be optimum, there is actually no limit in the frequency range which may extend from the audio through and beyond radio frequencies and the kilomegacycle range. A Tesla coil or other suitable stepup transformer connected to the high frequency generator provides the high voltage required for the discharge.

By the aforementioned procedures, the conductivity and the contact electrification normally indicated for any mineral, can be modified or changed to a greater or lesser extent depending mainly upon the reactions caused to occur on the surfaces of the mineral particles as found in the composite ore. The degree of contact electrification in a mineral is a measure of the quantity of electrical charge on particles thereof after they pass over a vibrating feed plate device having a contact surface of selected material. Aluminum is used for the feed device because its contact electrification property is of intermediate value whereas this property in other metals or surfaces may vary. For example, with magnesium most minerals are charged negative. Although not indispensable as a charging device, the vibrating feed plate is used as a standard for comparison in these tests. This charging effect which also prepares the particles for the application of electrostatic separation may also be obtained by simply causing the particles to flow over an inclined surface or roll in an inclined rotating tube. All of these devices provide multicontact of the mineral particle with a second surface. Contact electrification charges may thereafter be determined by collecting the mineral particles in an insulated container after they leave the vibrating feed device. The container is connected to an electrometer which measures both the magnitude and polarity of the charge. However, a more simple method is to evaluate the results of the static field separator with change in the polarity of the electrode. With conductive mineral particles the degree of deflection, or percent conductor fraction, is the same regardless of the electrode polarity. Nonconductive minerals which require charging by contact electrification have a change in the degree of deflection with a change in electrode polarity. The minerals beryl, microcline (feldspar), quartz, talc, fluorite and tremolite are all nonconductors and consequently have a change in the degree of deflection with a change in electrode polarity. Determination of the change in conductivity requires that the treated minerals be passed through an ionizing roll-type electrostatic separator comprising a roll and a single wire ionizing electrode of the type described on pages 2 and 3 of the inventor's Bureau of Mines Report of Investigations 5542, published in 1959. A further description of electrostatic separation may be found in columns 3 and 4 of the Gross et al. Patent No. 3,008,573, of November 14, 1961. The percentage of the total feed of mineral particles which passes beyond a fixed dividing edge of the separator, is a measure of the conductivity of these particles. It is the relative strength of such conductivity and contact electrification properties of the minerals in the mixture which importantly control the degree of separation, and the character of the component products in an electrostatic separator.

Accordingly, it is an object of this invention to provide a method whereby minerals are conditioned by treating them in a fluid and by raising the energy level in the fluid to render the minerals therein more amenable to electrostatic separation.

It is further an object of the present invention to provide a pretreatment with a gas and an electrical discharge, upon a continuous feed of granular mineral matter.

These and other objects and advantages of the invention will be more clearly understood from the following description of a preferred embodiment of the invention, considered together with the accompanying drawing wherein.

Figure 1:
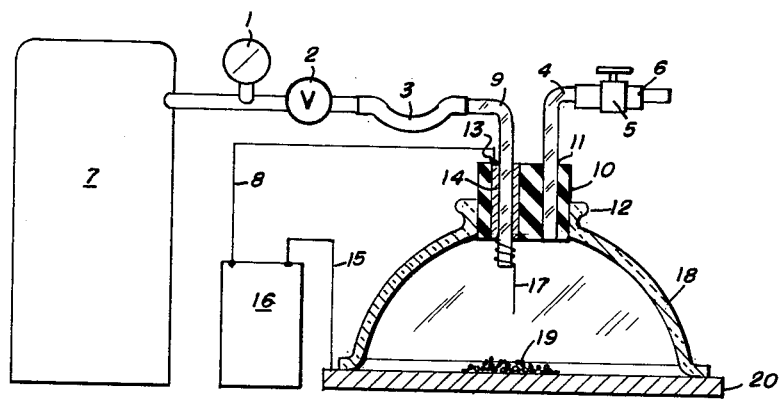
FIG. 1 is a schematic presentation of a simplified arrangement of structure by means of which the method of the invention may be accomplished.

To illustrate the phenomenon underlying the method of the invention, different samples of fluorite particles of size minus 35, plus 65 mesh, were variously pretreated, and thereafter passed through a static field roll-type separator. A detailed disclosure of this separator, found on pages 3 and 4 of the aforementioned R.I. 5542, describes a metal cylinder serving as an electrode of one polarity, and a second metal cylinder or feed roll performing the function of both an opposite polarity electrode and a carrier for the particles, both electrodes producing a static field having located immediately below it a dividing edge at zero potential. Thus located, the edge facilitates the separation for collection of the fraction of the fluorite particles deflected away from the carrier electrode, and the fraction of residue particles tending to remain close to the carrier electrode. A study of an analysis of these products of separation, conclusively demonstrates that changes in the contact electrification and conductivity properties of minerals are effectuated by a pretreatment in accordance with the invention. Table 1, below, lists results from an analysis of materials processed in the separator, which included two different samples of fluorite particles. Each pass through the separator was performed twice, first with the carrier electrode positive and again with the carrier electrode negative. The polarities are represented in Table 1 as that of the adjacent electrode and are accordingly tabulated as of opposite polarity. As indicated in this table, for each case in which a pretreatment was applied, the test therefor was made on a sample from which material was also tested without applying the pretreatment. Moreover, for each of the tests listed, the sample was first passed along a conventional vibrating feed device having an aluminum bed surface in order to provide a sufficient precharge to the feed supplied to the separator.

Table 1.—Analysis of Fluorite Particles

| Test No. | Sample | Pretreatment Applied [1] | Percent Fluorite | |
|---|---|---|---|---|
| | | | In fraction deflected towards negative electrode | In fraction deflected towards positive electrode |
| 1 | A | None | 72 | 44 |
| 2 | $A_1$ | In an enclosure with air and a discharge from a small positive surface electrode. | 40 | 77 |
| 3 | B | None | 63 | 43 |
| 4 | $B_1$ | In an enclosure with air and a discharge from a high frequency source. | 38 | 86 |
| 5 | $B_1$ | Second treatment of sample in an enclosure with helium and a discharge from a high frequency source. | 38 | 85 |
| 6 | $B_1$ | Further treatment of sample in an enclosure with hydrogen and a discharge of a high frequency source. | 55 | 46 |

[1] Pretreatment time=10 minutes.

Examination of the data for tests 1 and 2 makes it apparent that whereas in test 1 the predominant polarity of the fluorite was positive (since the presence of fluorite was more prominent in the material deflected towards the negative electrode than towards the positive electrode), with pretreatment as in test 2, the predominant polarity was reversed to negative (since the prominence of fluorite was now found in the fraction deflected towards the positive electrode). Pretreatment with an electrical discharge in air may therefore be seen to be effective to change the contact electrification of fluorite from positive to negative. A consideration of tests 3 and 4 indicate that a pretreatment of fluorite by high frequency in air produces the same results. Subsequent treatment of the material from test 4 by a high frequency discharge in helium produces no substantial change. However, noting test 6, where the treated sample of test 5 was further pretreated by a discharge of high frequency in hydrogen, it is seen that a secondary reversal of polarity occurs, although not completely to the state of the original sample in tests 1 and 3.

Microcline and quartz when pretreated exhibit similar changes in their electrical properties. Using a static field-roll type separator as before, the data shown in Table 2 was derived by separately processing minus 35, plus 65 mesh samples of these minerals.

Table 2.—Analysis of Microcline and Quartz Particles

| Test No. | Sample | Pretreatment Applied [1] | Percent of Fraction Deflected | |
|---|---|---|---|---|
| | | | To Positive Electrode | To Negative Electrode |
| | | | Microline | |
| 1 | A | None | 73 | 56 |
| 2 | $A_1$ | In an enclosure with oxygen and a high frequency discharge. | 55 | 70 |
| | | | Quartz | |
| 3 | B | None | 86 | 52 |
| 4 | $B_1$ | In an enclosure with oxygen and a high frequency discharge. | 71 | 71 |

[1] Pretreatment time=10 minutes.

From the analysis for tests 1 and 2, it is evident that after a pretreatment whereby microcline was subjected to a high frequency discharge in oxygen, this mineral's predominant negative polarity reversed so that it assumed a predominant positive polarity. In test 3, the quartz particles pretreated by high frequency discharge in oxygen increased in positive polarity, but only to the extent of being equally deflected by negative and positive electrodes.

The application of pretreatment to the separation of microcline from quartz in a reclean reject, proved effective to significantly increase the recovery of microcline in the deflected fraction. In Table 3 are listed the results of the separation operations as carried out on separate samples of size minus 35, plus 65 mesh, from the same mineral source, in a static field roll-type separator.

Table 3.—Analysis, Separation of Microcline From Quartz

| Test No. | Sample Pretreatment Applied [1] | | Deflected Fraction | | Residue Fraction | | Percent of Total Microcline Concentrated in Deflected Fraction |
|---|---|---|---|---|---|---|---|
| | | | Percent of Total Feed | Composition Percent Microcline | Percent of Total Feed | Composition Percent Microcline | |
| 1 | A | None | 53 | 73 | 47 | 55 | 60 |
| 2 | B | In an enclosure with oxygen and a negative electrode discharge. | 43 | 94 | 57 | 24 | 75 |
| 3 | C | In an enclosure with carbon dioxide and a negative electrode discharge. | 37 | 87 | 63 | 44 | 66 |

[1] Pretreatment time=10 minutes.

Reference to the deflected fraction composition column of Table 3 reveals a substantial increase in the grade of the microcline concentrate when a pretreatment in oxygen was applied in test 2, although a lesser increase in grade is found for test 3 using carbon dioxide.

An illustration of the relative effects of a discharge in ammonia and oxygen is summarized in Table 4. Ammonia without a discharge will increase the positive polarity of microcline and quartz, but not as effectively as with a discharge. For this demonstration it is necessary to partially deactivate the mineral surface by preliminary heat treatment. In tests 1 and 6, the microcline and quartz assume a predominant positive polarity with ammonia alone, but to a lesser extent after heat treatment as illustrated in tests 3 and 8. The subsequent treatment of both of these samples with an ionized discharge in oxygen as illustrated in tests 4 and 9 provides for no increase in positive polarity. However, an ionized discharge in ammonia in tests 5 and 10, almost completely restores the minerals to their initial state. Tests 10 and 11 demonstrate that the polarity of the discharge electrode has no significant effect on the results.

Normally it is nearly impossible to obtain any degree of separation with beryl ore processed through an electrostatic separator. However, after an electrical pretreatment, some degree of separation can be achieved. A minus 35, plus 65 mesh fraction of Beryl Mountain (New Hampshire), beryl ore was passed over a 5-roll static-field type separator. The first, second and fourth rolls had negative electrodes, and the third and fifth rolls, positive electrodes. The beryl responded as though positively charged and the gangue, negatively charged. Pretreatment of the final beryl concentrate was carried out by subjecting this beryl to an electrical discharge in oxygen for 10 minutes. The resulting improved separation when the beryl was thereafter passed through the separator was noted in that of the 3.7 percent of the weight of the concentrate which was deflected, the composition was 21 percent beryl, which amounted to a 35 percent increase of the total beryl in the concentrate.

The electrical discharge in water vapor has an effect

*Table 5.—Analysis, Separation Products of a Feed Composition Having 1.5 Percent Beryl [1]*

| Test No. | Sample | Pretreatment Applied | Deflected Fraction | | Residue Fraction | | Percent of Total Beryl Lost in Residue Fraction |
|---|---|---|---|---|---|---|---|
| | | | Percent of Total Feed | Composition Percent Beryl | Percent of Total Feed | Composition Percent Beryl | |
| 1 | A | In enclosure with air [2] at 90° C | 22.3 | 3.8 | 77.7 | 0.84 | 43 |
| 2 | B | In enclosure with $H_2O$ [2] as gas at 90° C | 18.4 | 8.0 | 81.6 | 0.12 | 6 |
| 3 | C | In enclosure with $H_2O$ [2] as liquid at 90° C | 24.8 | 5.0 | 75.2 | 0.35 | 17 |

[1] Gangue is feldspar, quartz and muscovite.
[2] Pretreatment time=4 hours.

*Table 4.—Relative Effect of Discharge in Ammonia and Oxygen With Heat Treatment*

| Test No. | Sample | Pretreatment Applied [1] | Fraction Deflected Percent of Total Feed | |
|---|---|---|---|---|
| | | | To Positive Electrode | To Negative Electrode |
| | | | Microline | |
| 1 | A₁ | In an enclosure with ammonia. | 40 | 81 |
| 2 | A₁ | Heated in air at 400° C. for 15 minutes and cooled to 25° C. | 80 | 50 |
| 3 | A₁ | In an enclosure with ammonia. | 66 | 55 |
| 4 | A₁ | In an enclosure with oxygen and a high frequency discharge. | 76 | 44 |
| 5 | A₁ | In an enclosure with ammonia and a positive electrode discharge. | 49 | 78 |
| | | | Quartz | |
| 6 | B₁ | In an enclosure with ammonia. | 10 | 98 |
| 7 | B₁ | Heated in air at 400° C for 15 minutes and cooled to 25° C. | 85 | 44 |
| 8 | B₁ | In an enclosure with ammonia. | 67 | 73 |
| 9 | B₁ | In an enclosure with oxygen and a high frequency discharge. | 82 | 63 |
| 10 | B₁ | In an enclosure with ammonia and a positive electrode discharge. | 27 | 86 |
| 11 | B₁ | In an enclosure with ammonia and a negative electrode discharge. | 18 | 93 |

[1] Pretreatment time=10 minutes unless otherwise noted.

on beryl ore but not as great as water vapor alone. By means of a pretreatment of the beryl ore in water, without any electrical discharge, the beryl loss with gangue rejection was found to be substantially reduced. Samples so treated, were dried and fed to a static-field roll-type separator. Results of the tests run in the separator, as set out in Table 5, further indicates the effectiveness of pretreatment for improving the electrostatic separation of minerals.

Reference to the last column of Table 5 makes evident a very significant decrease in the loss of beryl with the gangue reject, when water pretreatment is applied either as a gas or a liquid.

For the electrical discharge in water vapor the gas phase is slightly superheated to prevent condensation and electrical breakdown on the electrode insulators. With an electrical discharge in water vapor no improvement over water vapor alone was noted. However, this does not rule out the advantageous effect of a discharge in water vapor. Different mineral combinations in other ores requiring different treatments, may be benefited by the application of a discharge.

The separation of talc from ore also proved to be benefited by various forms of pretreatment. Using a static-field roll-type separator, four samples of size minus 35, plus 65 mesh, where run through the separator with the following results.

Table 6.—Analysis, Separation of Talc From Ore [1]

| Test No. | Sample | Pretreatment Applied [2] | Deflected Fraction | | Residue Fraction | | Percent of Total Talc Concentrated in Residue Fraction |
|---|---|---|---|---|---|---|---|
| | | | Percent of Total Feed | Composition Percent Talc | Percent of Total Feed | Composition Percent Talc | |
| 1 | A | None | 87.0 | 26.3 | 13.0 | 63.2 | 26.4 |
| 2 | B | In an enclosure with oxygen and a negative electrode discharge. | 74.2 | 20.6 | 25.8 | 79.5 | 56.5 |
| 3 | C | In an enclosure with oxygen and a positive electrode discharge. | 77.0 | 19.6 | 23.0 | 71.0 | 52.0 |
| 4 | D | In an enclosure with oxygen and a high frequency discharge. | 73.6 | 15.0 | 26.4 | 71.0 | 63.0 |

[1] Gangue mineral is tremolite with traces of biotite and pyrite.
[2] Pretreatment time = 10 minutes.

The difference in polarity of the discharge electrodes in tests 2 and 3, did not affect the results to any extent in that for both tests a significant increase in the talc recovered with the residue, is noted. However, it would appear from the data of test 4, that the use of a high frequency discharge does produce the most noteworthy results.

Although a saleable grade was not produced, kyanite ore was concentrated after a discharge treatment in oxygen. To illustrate the effectiveness of gas composition two tests were conducted with a negative discharge electrode, one with nitrogen and the other with oxygen. Three rolls of a static field roll-type separator were used for separation. The deflected and residue fractions from the first roll were each repassed on each of the other two rolls. This resulted in a recleaned kyanite fraction, a scavenged reject fraction, and a combined middling fraction. The carrier electrode was positive with respect to the adjacent electrode and the kyanite was preferentially deflected away from the carrier electrode. The data of Table 7 demonstrates that the oxygen discharge treatment approximately doubles the grade of the kyanite concentrate of size minus 35, plus 65 mesh. The gangue is predominantly quartz, and other minerals were hematite and titanium minerals which passed in major proportion to the recleaned kyanite concentrate.

Table 7.—Separation of Kyanite From Ore After Nitrogen and Oxygen Pretreatment [1]

| Fraction | Nitrogen Discharge | | | Oxygen Discharge | | |
|---|---|---|---|---|---|---|
| | Percent of Total Feed | Composition Percent Kyanite | Percent of Total Kyanite in Fraction | Percent of Total Feed | Composition Percent Kyanite | Percent of Total Kyanite in Fraction |
| Recleaned kyanite | 40 | 25 | 47 | 26 | [2] 45 | 41 |
| Middling | 41 | 25 | 48 | 38 | [3] 40 | 53 |
| Final reject | 19 | 5 | 5 | 36 | [3] 5 | 6 |
| Total | 100 | 21 | 100 | 100 | 28 | 100 |

[1] Pretreatment time = 10 minutes.
[2] Approximately one-third of the impurity is hematite and titanium minerals.
[3] Impurity is quartz.

Conventional laboratory elements may be assembled to provide an apparatus suitable for carrying out the method according to the invention. One form of such an assemblage is shown in FIG. 1, wherein the substance to be treated 19 is placed on a metal plate 20, and covered over by a bell jar enclosure 18 whose rim is resting on the metal plate. In through the open neck 12 of the bell jar is tightly fitted a stopper 10 of rubber or the like, through which are drilled two longitudinal holes 11 and 14. A metal sleeve 13 in which is cemented one arm of a bent glass tube 9, is tightly fitted into the hole 14. In hole 11 there is similarly fitted an arm of a second bent glass tube 4. Soldered to the end of metal sleeve 13, facing inside the bell jar 18, and supported on the end of tube 9, is a thin wire electrode 17 extending downward into the jar. Lead wires 8 and 15 from the pole terminals of a controlled source of voltage or high frequency current 16, are connected to terminal means fixed to the opposite end of sleeve 13, and on the metal plate 20. The polarity requirements, if any, of the particular pretreatment concerned, determine which ones of the respective leads are connected to sleeve and plate. The gas selected for the pretreatment is supplied to glass tube 9 from a gas storage tank 7. A pressure gage 1 and valve 2 are fixed in the connecting supply line 3, in a conventional manner. Glass tube 4 is connected to pipe line 6 having therein a valve 5, through which the gas from the jar 18 may be exhausted to the atmosphere, or to a suitable disposing means therefor. Operation of the apparatus of FIG. 1 is started in an obvious manner, by opening valve 2 after the bell jar 18 is positioned over the material 19 spread upon the metal plate 20, and closing valve 5 after gas supplied from the tank 7 passes through tube 9 and fills the bell jar 18, and outlet tube 4. Controlled voltage source 16 is then activated to cause a continuing discharge from electrode 17 to the plate 20. After the predetermined time required for the pretreatment, source 16 is deactivated, valve 2 is closed and valve 5 is opened.

Figure 2:
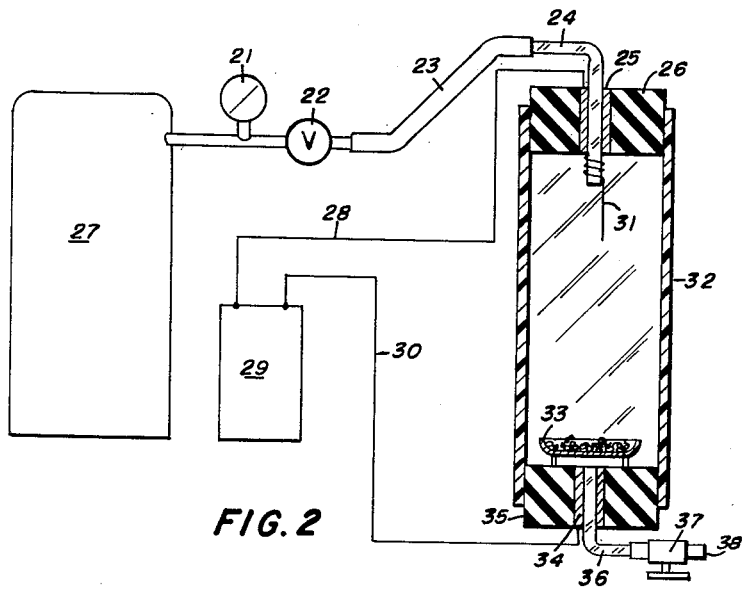
FIG. 2 is a similar arrangement, wherein potentially explosive gases may be used with safety.

In the arrangement of FIG. 2, there are found the elements previously described, some of which are modified to more safely accommodate the potentially explosive gases such as hydrogen or ammonia that may be used in the pretreatment. A large diameter cylindrical transparent plastic tube 32, plugged at its opposite open ends by appropriately sized rubber or plastic stoppers 26 and 35, provides an enclosure in which to carry out the invention. A metal sleeve 25 in which is cemented gas inlet glass tube elbow 24 fits tightly through a hole in stopper 26, and a similar arrangement of metal sleeve 34, and glass tube 36 fitted into stopper 35, provides an outlet for the gas. However, for this apparatus there is also provided a shallow aluminum dish 33 resting on the inside surface of stopper 35 and also in contact with sleeve 34. The surface of stopper 35 is sufficiently uneven so that the gas flow easily passes between the stopper and dish to enter outlet tube 36. Among the other elements shown in FIG. 2, are a valve 37 in an exhaust line 38, and a supply of gas 27, connected to inlet tube 24 through gage 21, valve 22, and tubing 23. The electrical elements and their connections are the same as those shown in FIG. 1, and include a potential source 29, a thin wire electrode 31 soldered to sleeve 25, and lead wires 28 and 30 joining the terminals of high voltage or high frequency current source 29 to terminals on the outer ends of sleeves 25 and 34, respectively. The thin wire electrode may also be described as a sharp pointed electrode. The electrical discharge results from the small surface electrode which may be either in the form of a thin wire or a sharp point at the end of a wire. The high frequency discharge may also be produced across wires 28 and 30, from a high frequency generator comprising either a spark discharge arrangement including a condenser and inductance, or a thermionic valve oscillator, connected to the Tesla coil transformer previously mentioned. At pressures of less than approximately 0.1 atmosphere the discharge does not require small surface electrodes, and for high frequency currents and low gas pressure the electrodes may be placed on the outside surface of insulating tube 32. An exemplary arrangement would provide plates of electrically conductive material, fixed to the opposite sides of the partially evacuated insulating tube 32, and connected to the high frequency source, for producing a high frequency in the capacitance effect across the tube. To operate the apparatus of FIG. 2, the material prepared for pretreatment is placed in the aluminum dish 33, and the stoppers are fitted into the ends of tube 32. Thereafter, the same procedure is applied here as was described for the apparatus of FIG. 1.

Figure 3:
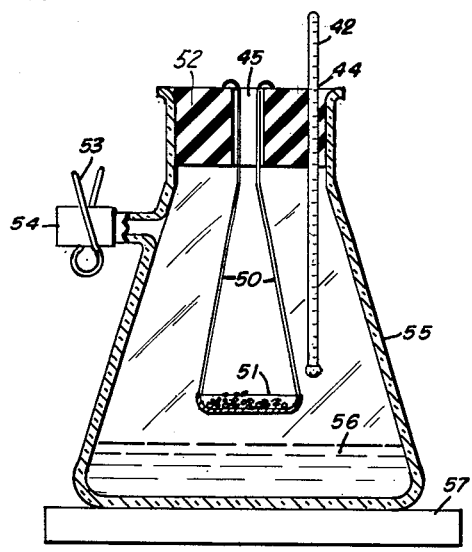
FIG. 3 is an arrangement wherein granular particles in an environment of water in the fluid or gaseous state may be treated according to the invention.

The arrangement of FIG. 3, simply provides a means for treating mineral particles with water as the fluid at a raised energy level. A flask 55 containing liquid water 56, is closed by means of an ordinary stopper 52, having a hole 44 therethrough in which a thermometer 42 may be fitted in a conventional manner. Suspended from the stopper by strands of wire 50, attached thereto, is a tray 51, containing the mineral sample. A second hole through the center of stopper 52, provides for a vent 45 for the water vapor generated in flask 55 by the heat from hot plate 57. For effectuating a pretreatment with water vapor gas, the tray may be held in position over the water 56 as shown in the figure, and for a pretreatment in liquid water, the tray is simply suspended within the water. During operation a rubber tube 54 and pinch clamp 53, closes a side opening of the flask 55. A pretreatment of a mineral sample in air at a raised energy level may also be accomplished in this apparatus by simply suspending the tray 51 in the air of the flask empty of water. The possible use of an electric discharge through this apparatus when it contains water vapor, requires that the part thereof enclosing the suspended tray and the electrodes, to be superheated such as by encircling an electric heating tape around the part. This is done in order to prevent electrical breakdown between the electrodes due to moisture condensation.

Figures 4, 5:
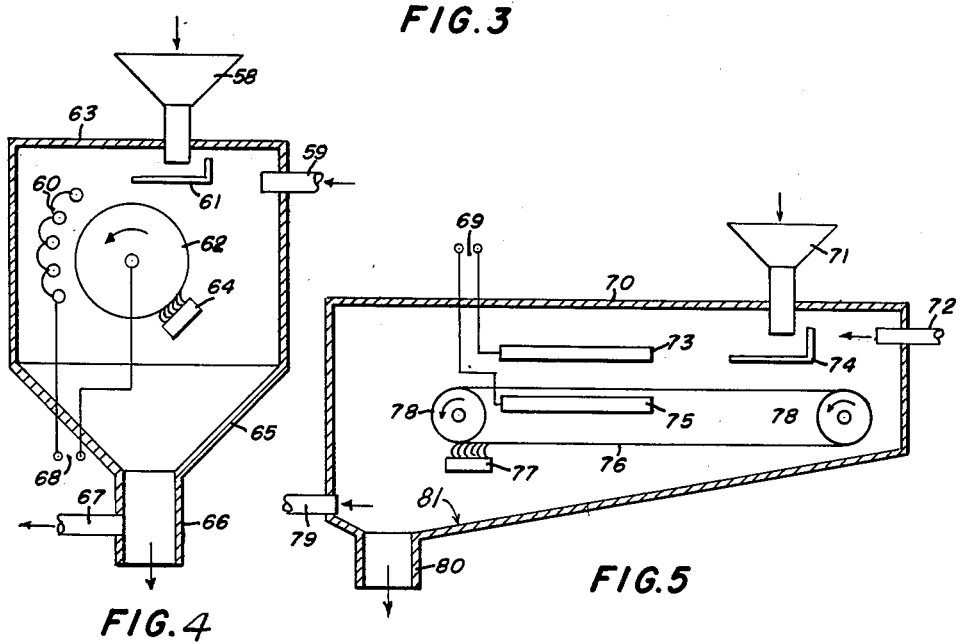
FIG. 4 is a simplified showing of an apparatus facilitating the application of the method described herein, to granular mineral matter supplied in a continuous stream.
FIG. 5 is a showing of still another form of apparatus in which granular mineral matter may be treated according to the method of the invention.

Arrangements such as shown in FIGS. 4 and 5, providing means which allow the pretreatment on a continuing basis are adaptable for large scale processing. Within a central portion of tank-like enclosure structure 63 of FIG. 4, are mounted a large rotatable feed carrying roll 62, made of electrically conducting material, and an arcuate arrangement of sectioned electrodes 60, spaced to one side and parallel to the roll surface. A mineral feed means including a funnel-shaped hopper 58 and a vibrator trough 61 are mounted within the upper area of enclosure 63, whereby the minerals may be conveniently fed at an appropriate pace, onto the upper surface of roll 62. A converging housing structure 65 constituting the bottom part of enclosure 63, receives the minerals leaving the roll after passing between the electrode 60 and the roll, and channels them into an exit chute 66. A brush device 64 clears the roll of any particles adhering to it, in a conventional manner. The gas selected for the pretreatment is entered through inlet pipe 59 and leaves through outlet pipe 67. Electrodes 60 and the roll 62 are electrically connected to the opposite poles of the terminals 68 of a high potential or high frequency current source (not shown). The operation of the apparatus proceeds in much the same manner as explained for the embodiments of FIGS. 1 and 2, except that the minerals are continuously moving through the field of discharge. The drive for roll 62, as well as the gas flow and electrical control are maintained for this apparatus in any convenient manner obvious to those skilled in the art.

Continuous operation may also be had with the apparatus shown in FIG. 5. Over-all enclosure 70 of this apparatus is equipped with the requisite mineral feed structures including hopper 71, vibrator trough 74, and discharge chute 80. Means supplied by inlet and outlet pipes 72 and 79 facilitate the flow of gas through the enclosure 70. A conveyor structure including an elongated carrier 76 supported on driven roll 78, receive the feed from the trough 74 and carries it between elongated electrodes elements 73 and 75 positioned parallel to the opposite sides of the belt with element 75 below the belt 76. The material for the construction of conveyor 76 may be of a variety of materials, including metal, in the form of either a mesh material or a nonporous sheet. Rubber cannot be used with oxygen since it rapidly deteriorates in ozone. However, a glass cloth would be most resistant to attack. Electrode 75 is not needed if the belt is electrically conductive, it need not contact the belt and may be dispensed with in adaptation to a high frequency discharge. The conveying speed of belt 76 is adjusted to provide for an appropriately timed exposure of the material thereon, to the discharge between electrodes 73, 75. A high potential or high frequency source (not shown), is connected by means of its terminals 69 to the respective electrodes 73 and 75 in the usual manner. A brush device 77 clears the belt of adhering material, and the conveying bottom 81 of the enclosure 70 receives such material and those dropping off from the belt 76 as in turns about driving roll 78. To operate the apparatus of FIG. 5, an appropriate feed control is exercised over hopper 71 and trough 74, while belt 76 is driven to bring the materials between electrodes 73, 75. Gas and electrical flow are controlled in the manner previously indicated.

While preferred embodiments of the invention have been illustrated and described herein, it is to be understood that the invention is not limited thereby, but is susceptible of changes in form and detail.

What is claimed is:

1. A process for pretreating the constituents of a mineral composite ore of the group consisting of fluorite ore, beryl ore, talc-tremolite ore, microcline-quartz ore, and kyanite-quartz ore, comprising comminuting said ore to particulate form, isolating said ore from varying atmospheric conditions by enclosing it in a zone, passing a gas selected from the group consisting of air, hydrogen oxygen, carbon dioxide, ammonia, water vapor and nitrogen into said zone to fill the same, and treating the said ore by passing an electric discharge through said gas, whereby at least one of the composite constituents of said ore so treated changes its conductivity and contact electrification properties.

2. A pretreating process for use in an electrostatic separation of the constituents of a mineral composite ore of the group consisting of fluoride ore, beryl ore, talc-tremolite are, microcline-quartz ore, and kyanite-quartz ore, which comprises enclosing within a zone an ore in particulate form, whereby to isolate the ore from varying atmospheric conditions, passing a gas selected from the group consisting of air, hydrogen, oxygen, carbon dioxide, ammonia, water vapor and nitrogen into said zone to fill the same, and treating the said ore by passing an electric discharge through said gas, whereby at least one of the composite constituents of said ore so treated changes its conductivity and contact electrification properties and said composite constituents are thereby rendered more amenable to electrostatic separation.

3. The process of claim 1, wherein the electrical discharge is produced from an electrode having applied thereto a potential characterized by a polarity which alternates at a high frequency.

4. The process of claim 1, wherein the electrical discharge is produced at a negative electrode.

5. The process of claim 1, wherein the electrical discharge is produced at a positive electrode.

6. A process for pretreating the constituents of a mineral composite ore, comprising comminuting said ore to particulate form, isolating said ore from varying atmospheric conditions by enclosing it in a zone, passing a fluid into said zone to fill the same, and treating the said ore by passing an electric discharge through said fluid, whereby at least one of the composite constituents of said ore so treated changes its conductivity and contact electrification properties.

7. The process of claim 6, wherein the mineral composite ore comprises microcline and quartz, and the fluid is gaseous oxygen.

8. The process of claim 6, wherein the mineral composite ore comprises beryl and microcline, and the fluid is air.

9. The process of claim 6, wherein the mineral composite ore comprises talc and tremolite, and the fluid is gaseous oxygen.

10. The process of claim 6, wherein the mineral composite ore comprises kyanite and quartz, and the fluid is gaseous oxygen.

11. The process of claim 6, wherein the mineral composite ore comprises microcline and quartz, and the fluid is gaseous carbon dioxide.

12. The process of claim 6, wherein the mineral composite ore comprises kyanite and quartz, and the fluid is gaseous nitrogen.

13. The process of claim 6 wherein the mineral composite ore comprises microcline and quartz, and the fluid is gaseous ammonia.

14. The process of claim 6, wherein the mineral composite ore comprises fluorite, and the fluid is gaseous hydrogen.

15. A process for preheating the constituents of a mineral composite ore, comprising comminuting said ore to particulate form, isolating said ore from varying atmospheric conditions by enclosing it in a zone, passing water vapor into said zone to fill the same, and treating the said ore by raising the energy level in said water vapor, whereby at least one of the composite constituents of said ore so treated changes its conductivity and contact electrification properties.

16. The process of claim 15, wherein the mineral composite ore comprises beryl and microcline.

17. A process for pretreating the constituents of a mineral composite ore, comprising comminuting said ore to particulate form, isolating said ore from varying atmospheric conditions by enclosing it in a zone, passing water into said zone to fill the same, and treating the said ore by raising the energy level in said water, whereby at least one of the composite constituents of said ore so treated changes its conductivity and contact electrification properties.

18. The process of claim 17, wherein the mineral composite ore comprises beryl and microcline.

19. A pretreating process for the electrostatic separation of the constituents of composite ores which comprises enclosing them in a zone of water vapor at an elevated temperature commensurate with a pressure in the enclosed zone for maintaining water vapor throughout the zone in a gaseous phase, and for a prescribed length of time whereby at least one of the composite constituents of said ore so treated changes its conductivity and contact electrification properties.

20. A pretreating process for the electrostatic separation of the constituents of composite ores which comprises enclosing them in a zone of water vapor at an elevated temperature commensurate with pressures in the enclosed zone maintaining water vapor throughout the zone in a gaseous phase, for a prescribed length of time followed by drying whereby at least one of the composite constituents of said ore so treated changes its conductivity and contact electrification properties.

21. A pretreating process for the electrostatic separation of the constituents of a composite ore of beryl which comprises enclosing it in a zone of water vapor at a temperature of approximately 100° C. which is commensurate with a pressure in the enclosed zone for maintaining vapor throughout the zone in a gaseous phase, for approximately 4 hours followed by drying whereby at least one of the composite constituents of said ore so treated changes it conductivity and contact electrification properties.

22. A process for pretreating the constituents of a fluorite ore, comprising comminuting said ore to particulate form, isolating said ore from varying atmospheric conditions by enclosing it in a zone, passing oxygen into said zone to fill the same, and treating the said ore by passing on electrical discharge through the oxygen, whereby at least one of the composite constituents of said ore so treated changes its conductivity and contact electrification properties.

23. A process for pretreating the constituents of a fluorite ore comprising comminuting said ore to particulate form, isolating said ore from varying atmospheric conditions by enclosing it in a zone, passing air into said zone to fill the same, and treating the said ore by passing an electrical discharge through said air whereby at least one of the constituents of said ore so treated changes its conductivity and contact electrification properties.

References Cited in the file of this patent

UNITED STATES PATENTS

| | | |
|---|---|---|
| 1,153,182 | Schniewind | Sept. 7, 1915 |
| 2,723,029 | Lawver | Nov. 8, 1955 |